(12) United States Patent
Mugundan et al.

(10) Patent No.: US 9,692,809 B2
(45) Date of Patent: *Jun. 27, 2017

(54) MAXIMIZING DATA TRANSFER THROUGH MULTIPLE NETWORK DEVICES

(71) Applicant: Microsoft Technology Licensing, LLC, Redmond, WA (US)

(72) Inventors: Balendran Mugundan, Redmond, WA (US); Peter Gvozdjak, Sammamish, WA (US); Sapna Jeswani, Seattle, WA (US); Jimmy Yu Wu, Bellevue, WA (US); Raghu Ram, Redmond, WA (US); Chadwin Mumford, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 506 days.

This patent is subject to a terminal disclaimer.

(21) Appl. No.: 14/244,169

(22) Filed: Apr. 3, 2014

(65) Prior Publication Data
US 2014/0222959 A1   Aug. 7, 2014

Related U.S. Application Data

(63) Continuation of application No. 13/086,272, filed on Apr. 13, 2011, now Pat. No. 8,694,618.

(51) Int. Cl.
*H04L 29/08* (2006.01)
*H04L 12/26* (2006.01)
*H04L 12/863* (2013.01)
*H04L 12/891* (2013.01)
*H04L 12/709* (2013.01)

(52) U.S. Cl.
CPC .......... *H04L 67/10* (2013.01); *H04L 43/0829* (2013.01); *H04L 47/41* (2013.01); *H04L 47/624* (2013.01); *H04L 45/245* (2013.01); *Y02B 60/33* (2013.01)

(58) Field of Classification Search
CPC ......................... H04L 43/0829; H04L 47/624
See application file for complete search history.

(56) References Cited

U.S. PATENT DOCUMENTS 6,202,169 B1   3/2001   Razzaghe-Ashrafi et al.
6,286,104 B1   9/2001   Buhle et al.
(Continued)

OTHER PUBLICATIONS

Office Action dated Aug. 8, 2014 cited in U.S. Appl. No. 13/086,269.
(Continued)

*Primary Examiner* — Lashonda Jacobs
(74) *Attorney, Agent, or Firm* — Workman Nydegger

(57) ABSTRACT

A first computer utilizes a logical connection with a second computer. The logical connection comprises multiple physical network connections using multiple physical network devices on the first computer. Two or more of the physical network devices of a logical connection are used to transfer packets of a single data transfer such as a database request or response. A logical connection can include a single physical network device on the second computer creating a one-to-many logical connection or may also include multiple physical network devices on the second computer creating a many-to-many logical connection.

20 Claims, 5 Drawing Sheets

(56) References Cited

U.S. PATENT DOCUMENTS

| | | | |
|---|---|---|---|
| 6,308,281 | B1 | 10/2001 | Hall et al. |
| 6,310,884 | B1 | 10/2001 | Odenwald, Jr. |
| 6,421,688 | B1 | 7/2002 | Song |
| 6,560,630 | B1 | 5/2003 | Vepa et al. |
| 6,654,373 | B1 | 11/2003 | Maher |
| 6,697,868 | B2 | 2/2004 | Craft et al. |
| 6,801,914 | B2 | 10/2004 | Barga |
| 6,804,815 | B1 | 10/2004 | Kerr |
| 7,007,103 | B2 | 2/2006 | Pinkerton et al. |
| 7,027,439 | B1 | 4/2006 | Barrow et al. |
| 7,437,547 | B2 | 10/2008 | Hyder et al. |
| 7,477,644 | B2 | 1/2009 | Georgiou et al. |
| 7,545,741 | B1 | 6/2009 | Manickavasagam et al. |
| 7,590,755 | B2 | 9/2009 | Pinkerton et al. |
| 7,639,624 | B2 | 12/2009 | McGee et al. |
| 7,643,427 | B2 | 1/2010 | Kokku |
| 7,673,074 | B1 | 3/2010 | Sebastian |
| 7,673,168 | B2 | 3/2010 | Matsuda |
| 7,689,702 | B1 | 3/2010 | Tripathi et al. |
| 7,835,369 | B2 | 11/2010 | Hu et al. |
| 7,849,208 | B2 | 12/2010 | Elzur et al. |
| 7,873,984 | B2 | 1/2011 | Hammons et al. |
| 7,876,689 | B2 | 1/2011 | McGee |
| 7,912,064 | B2 | 3/2011 | Elzur |
| 7,966,405 | B2 | 6/2011 | Sundaresan et al. |
| 8,068,498 | B2 | 11/2011 | Chiba |
| 8,134,928 | B1 | 3/2012 | Manickavasagam et al. |
| 8,155,158 | B2 * | 4/2012 | Saavedra ............ H04L 12/2867 370/229 |
| 8,285,881 | B2 | 10/2012 | Elzur |
| 8,291,489 | B2 | 10/2012 | Droms et al. |
| 8,300,647 | B2 | 10/2012 | Abdulla et al. |
| 8,369,349 | B2 * | 2/2013 | Martinez ............... H04L 47/125 370/216 |
| 2003/0108066 | A1 | 6/2003 | Trippe |
| 2004/0044796 | A1 | 3/2004 | Vangal |
| 2006/0098573 | A1 | 5/2006 | Beer et al. |
| 2006/0153238 | A1 | 7/2006 | Bar-On et al. |
| 2006/0227703 | A1 | 10/2006 | Hung et al. |
| 2006/0268866 | A1 | 11/2006 | Lok |
| 2008/0016511 | A1 | 1/2008 | Hyder |
| 2008/0189433 | A1 | 8/2008 | Nelson et al. |
| 2008/0310444 | A1 | 12/2008 | Dekel et al. |
| 2009/0063509 | A1 | 3/2009 | Lockhart |
| 2009/0086736 | A1 | 4/2009 | Foong |
| 2009/0119536 | A1 | 5/2009 | Guo |
| 2009/0248950 | A1 | 10/2009 | Tamaki et al. |
| 2011/0019553 | A1 | 1/2011 | Tripathi et al. |
| 2011/0202667 | A1 | 8/2011 | Kimball et al. |
| 2012/0210169 | A1 | 8/2012 | Coile et al. |
| 2012/0265801 | A1 | 10/2012 | Mugundan |
| 2012/0265855 | A1 | 10/2012 | Mugundan |
| 2012/0266211 | A1 | 10/2012 | Mugundan |
| 2013/0114606 | A1 | 5/2013 | Schrum et al. |

OTHER PUBLICATIONS

Nishijima, Takamichi, et al., On Maximizing IP-SAN Throughput over TCP Connections with Automatic Parallelism Tuning for Long-Fat Networks, 2009 Ninth Annual International Symposium on Applications and the Internet, 2009 IEEE, pp. 251-254.

Business Wire, "Ecessa Enables SMEs to Maximize Bandwidth from Multiple Internet Links to Support Bandwidth-Consuming Applications", Sep. 15, 2009, 3 pages.

Inoue, Fumito, et al., "On Maximizing iSCSI Throughput Using Multiple Connections with Automatic Parallelism Tuning", 2008, 6 pages.

Ito, Takeshi, et al., "GridFTP-APT: Automatic Parallelism Tuning Mechanism for Data Transfer Protocol GridFTP", 2006, 8 pages.

Zhang, Junyu, et al., "To Improve Throughput Via Multi-Pathing and Parallel TCP on Each Path," 2009 Fourth ChinaGrid Annual Conference, Nov. 17, 2009, pp. 16-21.

Naldini, Andrea, et al., "Increasing Performance of TCP Data Transfers through Multiple Parallel Connections", 2009, 7 pages.

Fiore, M., et al., "Concurrent Multipath Communication for Real-Time Traffic", Dec. 2006, pp. 3307-3320.

Schlansker, Michael, et al., "High-Performance Ethernet-Based Communications for Future Multi-Core Processors", Nov. 16, 2007, 12 pages.

Saibal, "Failover and Load Balancing in Oracle", Apr. 20, 2007, 8 pages.

Prabhu S & Venkat R., "High Availability for Network Management Applications", 2007 IEEE, 6 pages.

Juniper Networks, "VPN Resiliency", Jun. 2006, 3 pages.

Oracle Data Provider for .NET Developers Guide, "Connecting to the Oracle Database", Based on information and belief available, at least as early as Jan. 31, 2011, 7 pages.

"Highly Available Databases", at least as early as Jan. 31, 2011, 4 pages.

Bytes, "Reestablishing a db Connection after a Network Failure," 2005, 3 pages.

Gibb, Allan, Dr., "Data Replication in Low Bandwidth Military Evironments—State of the Art Review", at least as early as Jan. 31, 2011, 10 pages.

Oracle, "Recovering from a Server Failure", at least as early as Jan. 31, 2011, 12 pages.

West et al., "TCP/IP Field Behavior", Network Working Group, Mar. 2006, pp. 1-42.

Postel, "The TCP Maximum Segment Size and Related Topics", Network Working Group, Nov. 1983, pp. 1-11.

U.S. Appl. No. 13/086,272, Feb. 12, 2013, Office Action.
U.S. Appl. No. 13/086,269, Feb. 15, 2013, Office Action.
U.S. Appl. No. 13/086,959, Jun. 27, 2013, Office Action.
U.S. Appl. No. 13/086,272, Jul. 15, 2013, Office Action.
U.S. Appl. No. 13/086,959, Sep. 11, 2013, Notice of Allowance.
U.S. Appl. No. 13/086,269, Sep. 25, 2013, Office Action.
U.S. Appl. No. 13/086,272, Nov. 15, 2013, Notice of Allowance.

\* cited by examiner

MAXIMIZING DATA TRANSFER THROUGH MULTIPLE NETWORK DEVICES

CROSS-REFERENCE TO RELATED APPLICATIONS

This application is a continuation of U.S. patent application Ser. No. 13/086,272 filed on Apr. 13, 2011, entitled "MAXIMIZING DATA TRANSFER THROUGH MULTIPLE NETWORK DEVICES," which issued as U.S. Pat. No. 8,694,618 on Apr. 8, 2014, and which application is expressly incorporated herein by reference in its entirety.

BACKGROUND

Background and Relevant Art

Many computing devices contain multiple physical network devices. For example, a computer can contain an Ethernet network interface card, an 802.11 network interface card, and oftentimes other network interface cards. Additionally, each different physical network device may employ different network packet routing systems. For example, when an application desires to communicate data over a network, a connection is established via one of the physical network devices. The data is then transmitted over the network in a format that conforms to the network packet routing system (e.g. TCP/IP) employed by the physical network device used to establish the connection.

The bandwidth of a network connection is generally limited by the maximum data rate at which the physical network device used to create the connection is capable of operating. Most processors are capable of generating or processing data faster than the data can be transferred over a network connection. Thus, the bandwidth of a connection is often a limiting factor in the overall performance of an application. That is, the application would be capable of executing more quickly if it were able to send and receive data more quickly.

BRIEF SUMMARY

The present invention extends to methods, systems, and computer program products for maximizing data transfer through multiple network devices. Embodiments include using multiple network devices within a logical connection for sending data from a first computer to a second computer in response to a request. In one embodiment, a request is received by the first computer from the second computer. In response to the request, the first computer generates data to be included in a response to the request to be sent to the second computer.

The first computer determines that the second computer includes at least two physical network devices that are included in a logical connection between the first and second computers. The first computer divides the data of the response into packets, and assigns the packets among the at least two physical network devices of the second computer in the logical connection. The first computer then sends each of the packets to the assigned physical network device of the second computer such that the response is sent to the second computer over a logical connection comprising a plurality of physical network connections.

In another embodiment, a first computer creates a request and divides the request into multiple packets to be sent over a logical connection. The first computer includes multiple physical network devices that can establish network connections to transmit data. The logical connection includes two or more of the physical network devices on the first computer. The first computer divides the packets of the request between the two or more physical network devices of the logical connection.

The first computer sends the packets to the second computer over the logical connection. Accordingly, different packets of the request are sent by different physical network devices from among the two or more physical network devices of the logical connection. The first computer receives a response to the request from the second computer by receiving packets of the data of the response at each of the two or more physical network devices. The first computer processes the received packets to generate the response.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
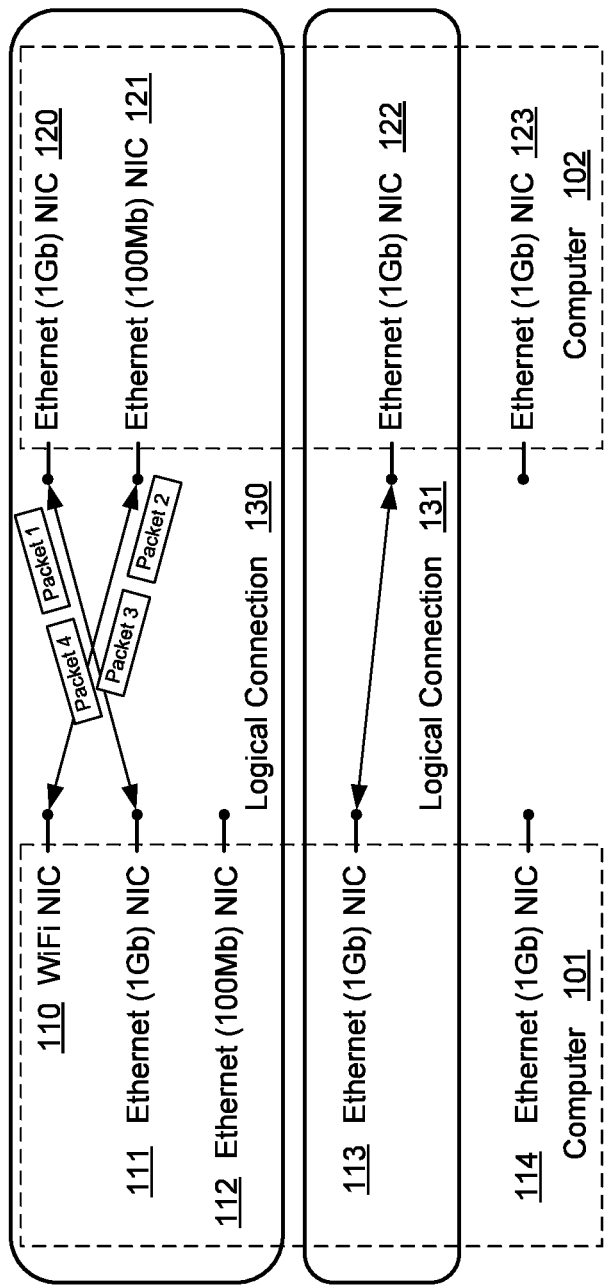
FIG. 1 illustrates an example computer architecture that facilitates maximizing data transfer through multiple network devices.

The present invention extends to methods, systems, and computer program products for maximizing data transfer through multiple network devices. Embodiments include using multiple network devices within a logical connection for sending data from a first computer to a second computer in response to a request. In one embodiment, a request is received by the first computer from the second computer. In response to the request, the first computer generates data to be included in a response to the request to be sent to the second computer.

The first computer determines that the second computer includes at least two physical network devices that are included in a logical connection between the first and second computers. The first computer divides the data of the response into packets, and assigns the packets among the at least two physical network devices of the second computer in the logical connection. The first computer then sends each of the packets to the assigned physical network device of the second computer such that the response is sent to the second computer over a logical connection comprising a plurality of physical network connections.

In another embodiment, a first computer creates a request and divides the request into multiple packets to be sent over a logical connection. The first computer includes multiple physical network devices that can establish network connections to transmit data. The logical connection includes two or more of the physical network devices on the first computer. The first computer divides the packets of the request between the two or more physical network devices of the logical connection.

The first computer sends the packets to the second computer over the logical connection. Accordingly, different packets of the request are sent by different physical network devices from among the two or more physical network devices of the logical connection. The first computer receives a response to the request from the second computer by receiving packets of the data of the response at each of the two or more physical network devices. The first computer processes the received packets to generate the response.

A logical connection includes one or more physical network connections that may be concurrently or consecutively established. Whether concurrently or consecutively established, multiple physical network connections may be established using the same or different physical network devices. A logical connection functions to abstract the underlying physical connection from the connection at the application level. Thus, a switch from one physical network connection to another is transparent to the application.

The present invention extends to embodiments which use multiple physical network connections of a logical connection concurrently to transmit packets of a data transfer (i.e. using different physical network devices within the logical connection to transmit or receive packets of the data transfer). As a result, an application's maximum data throughput (sending and/or receiving) is increased as a function of the sum of the bandwidth of the network connection over each of the physical network devices of the logical connection.

An example logical connection includes two or more physical connections between a client computer and a database server when the client computer submits a database request to the database server. The client computer contains multiple physical network devices that are each individually capable of establishing a physical network connection to send and/or receive data. The database server responds to the client's database request by creating a response (e.g. rows of data from the database) that is divided into packets. These packets are sent to the client. Different packets of the response are sent to different physical network devices of the client. Thus, the single response is divided and sent over multiple physical network connections of the logical connection. Although the above example describes a logical connection between a client and a server, the present invention extends to logical connections between any two computers connected in any network topology such as client/server and peer-to-peer.

For example, a computer having both an Ethernet network interface card (MC) and an 802.11 NIC can expose different IP addresses for each NIC. Rather than send the response to a single IP address associated with a single NIC, embodiments of the invention would send packets of the response to each of the NICs. In this manner, the data is transmitted to the computer more quickly because the bandwidth provided by the network connections of each NIC is used to receive the data. Two or more physical network devices of the same type (e.g. two Ethernet NICs) could also be used to establish the logical connection. The invention is not limited to any particular network packet routing protocol. Any network packet routing protocol can be used for any of the individual network connections. Further, different physical network connections within the same logical connection can use different network packet routing protocols.

Multiple physical network devices in a logical connection can be used to send data to a computer. For example, a database server can employ a logical connection to send a response to a client. The logical connection can employ multiple physical network devices to send the data. For example, packets of the response could be divided and sent over different NICs on the database server.

Thus, multiple physical network devices can be used on both ends of a logical connection. In such an embodiment, the sending and the receiving computers both employ multiple physical network devices. For example, the database server could send the response to multiple physical network devices of the client using multiple of its own physical network devices.

Embodiments of the present invention may be implemented by any computer capable of establishing multiple physical network connections. Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD, or other optical disk storage, magnetic disk storage or other magnetic storage devices, or any other medium which can be used to store desired program code means (software) in the form of computer-executable instructions or data structures and which can be accessed by a general purpose or special purpose computer.

A "network" is defined as one or more data links that enable the transport of electronic data between computers and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer RAM and/or to less volatile computer storage media (devices) at a computer. Thus, it should be understood that computer storage media (devices) can be included in computer components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computers, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates maximizing data transfer through multiple network devices. As depicted, logical connections 130 and 131 have been established between computers 101 and 102. Computer 101 contains five physical network devices: WiFi NIC 110, 1 Gb Ethernet NIC 111, 100 Mb Ethernet NIC 112, 1 Gb Ethernet NIC 113, and 1 Gb Ethernet NIC 114. Computer 102 contains four physical network devices: 1 Gb Ethernet NIC 120, 100 Mb Ethernet NIC 121, 1 Gb Ethernet NIC 122, and 1 Gb Ethernet NIC 123.

Logical connection 130 includes WiFi NIC 110, 1 Gb Ethernet NIC 111, and 100 Mb Ethernet 112 NICs and 1 Gb Ethernet NIC 120 and 100 Mb Ethernet NIC 121. The data transfer being transmitted includes four packets. Packets 1 and 4 are transmitted from 1 Gb Ethernet NIC 111 to 1 Gb Ethernet NIC 120, whereas packets 2 and 3 are transmitted from WiFi NIC 110 to 100 Mb Ethernet NIC 121. Although 100 Mb Ethernet NIC 112 is part of logical connection 130, 100 Mb Ethernet NIC 112 is not being used to transmit packets of the data transfer.

Logical connection 131 includes 1 Gb NIC 113 and 1 Gb NIC 122. Accordingly, embodiments include computers and/or applications that utilize two logical connections concurrently. For example, the same application could use both logical connection 130 and logical connection 131 to transfer data. In one embodiment, a database client concurrently uses two logical connections for two separate queries to the same database server.

Embodiments of the invention include adding a physical network device to or removing a physical network device from a logical connection. A physical network device can be added or removed at any time before, during, or after a data transfer. For example, logical connection 131 can be modified to include 1 Gb Ethernet NIC 114 at any time to increase network throughput available to an application executing on computer 101. 1 Gb Ethernet NIC 114 can be added to logical connection 131 based on data and/or network characteristics. For example, 1 Gb Ethernet NIC 114 can be added prior to commencing the transmission of a large data transfer in response to a determination by computer 101 that more network bandwidth would be desirable. Alternatively, 1 Gb Ethernet NIC 114 can be added during the transmission of the large data transfer upon determining that the data transfer would benefit from additional bandwidth. In such embodiments, a first computer may initially have a single physical network connection to a second computer, but may add another physical network connection to create a logical connection between the first and second computers.

On the other hand, a physical network device can be removed from a logical connection at any time. For example, it may be determined that a particular logical connection is consuming too much of the bandwidth capability of computer 101. In response, one or more physical network devices are removed from the logical connection. For example, if during transmission of a data transfer, it is determined that logical connection 130 is consuming too much bandwidth, 1 Gb Ethernet NIC 111 can be removed from logical connection 130. Whether a physical network device is added to or removed from a logical connection, the data to be transmitted or being transmitted over the logical connection is unaffected (i.e. the data will still be transmitted successfully over the physical network devices that remain part of the logical connection without having to restart the transmission).

Although FIG. 1 illustrates that logical connection 130 includes multiple physical network devices on both computer 101 and computer 102, a logical connection according to the invention may be established between multiple physical network devices on one side of the logical connection and a single physical network device on the other. For example, 100 Mb Ethernet NIC 121 could be removed from logical connection 130. In this scenario, all packets of the data transfer being sent by computer 102 to computer 101 over logical connection 130 would be sent via 1 Gb Ethernet NIC 120 to any of computer 101's three NICs included in logical connection 130. Similarly, all packets of the data transfer sent by computer 101 to computer 102 over logical connection 130 would be divided among computer 101's three NICs that are included in logical connection 130 and sent to computer 102's 1 Gb Ethernet NIC 120.

Data may be divided among the different physical network devices of a logical connection based on functionality. For example, a particular physical network device of a logical connection may be reserved for sending and/or receiving control information while the remaining physical network devices of the logical connection are used for data transfers. Any other usage restrictions may also be employed within a logical connection.

Data may also be divided among physical network devices of a logical connection based on other factors such as load balancing, link speed, etc. For example, if a logical connection consists of a 100 Mb Ethernet connection and a 54 Mb 802.11g connection, the sender may choose to send two data packets through the 100 Mb Ethernet connection per each data packet sent through the 54 Mb 802.11g connection.

Which physical network devices are used in a logical connection, how data packets are divided among the physical network devices, when physical network devices are added or removed from a logical connection, and the like can be user configurable options. For example, an application on computer 101 desiring to use a logical connection to communicate with computer 102 may be pre-configured to use a host file that defines the set of network addresses (i.e. the addresses of the physical network devices) of computer 102. These addresses could also be obtained by querying the DNS for the entire list of network addresses for computer 102. However, the manner in which the network addresses of a particular computer are obtained are not essential to the invention.

A "packet" as referred to above differs from a packet of a network routing protocol such as an IP packet. Packet is used to denote that the entire data transfer can be divided into multiple packets. For example, if a data transfer is the result of a database query—such as multiple rows of data, the packets may comprise the individual rows of data (i.e., a packet would contain a row). However, the same packet at the lower levels of the protocol stack, such as the TCP and IP layers, would likely be further divided into multiple TCP or IP packets. In other words, a single row (or packet) may be divided into multiple IP packets. A packet is not limited to a database row. In some embodiments, a row is divided among two or more packets, such as in the case where a row is too large to fit in a single packet.

The transferred data (e.g. the database query result) can be divided into multiple packets so that the packets can be allocated for concurrent transfer using multiple different network connections of a logical connection. For example, multiple physical network connections can be used to send a database query result (e.g. between one 1 Gb Ethernet NIC on the database server and 10 100 Mb Ethernet NICs on the client). Accordingly, query results can be received more quickly.

Thus, a single data transfer can be divided and sent over multiple physical network devices. For example, when a database query returns five rows of data, all five rows can be sent over a logical connection. The rows can be allocated to physical network devices based on any number of different approaches. For example, a first and fourth packet containing the first and fourth rows respectively can be sent over a first physical network device, a second and fifth packet containing the second and fifth rows respectively can be sent over a second physical network device, and a third packet containing the third row can be sent over a third physical network device. This is an example of a round robin approach to dividing the packets over the physical network devices of a logical connection. Other schemes for dividing the packets could also be used. Although rows of a database result are used in the above examples, the invention extends to the transfer of any data over a logical connection.

In the above example, each individual physical network device can communicate its allocated packets according to the device's packet routing protocol (which may be different from the packet routing protocol used by another device in the logical connection). For example, if a first physical network device is an Ethernet NIC that employs standard TCP/IP, the first and fifth packets can be subdivided into TCP and IP packets and transmitted over the network connection to the client computer. Likewise, if the second physical network device is a 3G/4G NIC that employs UDP, the second and fourth packets can be subdivided into UDP packets and transmitted over the network connection to the client computer.

When a logical connection is used to transfer data, the order in which the packets of the data transfer are received may not match the original order of the packets (i.e. the order of the data transfer before being transmitted), or the order in which the packets of the data transfer were sent. Referring back to the same example, the third packet may be received over the third network connection prior to the first, second, fourth, and fifth packets being received over the first and second network connections. In implementations where order is not relevant, the packets can be processed on the receiving computer in whatever order they are received. On the other hand, in situations where the order of the packets is relevant, embodiments of the invention employ a sequencing scheme to identify the order of the packets to enable the client computer to reconstruct the data transfer in the proper order.

The sequencing scheme provides a unique identifier to each packet that must be processed in order to identify the sequential order of the packets. By reading the identifiers, the receiving computer is able to determine which packet is the next sequential packet in the data transfer. In embodiments where the next packet is not received over the same physical network device as the previous packet in the sequence, the receiving computer may read from each of the other physical network devices in the logical connection to locate the next packet in the sequence. Thus, although send and receive ordering of packets may differ, the packets can still be processed in order. For example, the sequencing scheme can ensure that the packets are processed and supplied to a requesting application in the proper sequential order.

This sequencing scheme can also apply to subsets of the data transfer to indicate that partial ordering of the data transfer is required. In other words, only some of the packets in the data transfer may require in order processing. In such embodiments, the packets that do not require in order processing may be processed whenever they are received. In some embodiments, only the packets that require in order processing are assigned a sequence identifier. These packets can also be assigned a flag to indicate to the receiving computer which packets require in order processing. Further, in embodiments where a data transfer includes multiple sets that each require in order processing of the packets within each set, a different flag can be assigned to the packets of each set to indicate to which set the packets belong. For example, a first set of packets in the data transfer may be assigned a first flag, while a second set of packets in the data transfer may be assigned a second flag. In such embodiments, the sequence identifiers assigned to each set may also be independent. In other words, each set may be assigned sequence identifiers starting with the same number to indicate which packet in each set is the first packet of the set (e.g. the first packet in each set is assigned the number 1 as the sequence identifier).

Partial ordering may be appropriate when an item of the data transfer does not fit within the defined size of the packets. For example, if a data transfer is a batched database query being sent from a client to a database server, one item of the batch may be too large to fit within a packet. In this scenario, the item can be split between two or more packets which must be processed in order. At the same time, the remaining items of the batch may all fit within a single packet and may be processed in whatever order they are received. Another example is when a row of a database query result is too large to fit inside a single packet. In these embodiments, the row is split between two or more packets which will require in order processing at the receiving computer. It is to be understood that processing in order does not necessarily mean processing one packet before another, but could include processing two packets that require ordering at the same time.

Although the above description refers to the ordering of packets as they are sent, it is to be understood that embodiments of the invention do not require that the packets be physically sent in the proper order. Send order should be understood as the proper ordering of the packets based on how the data was divided into packets. Once divided, the packets could be physically sent over multiple physical network devices from the sending computer in various orders. Thus, a proper sequence should be construed as the sequence of the data prior to the data being divided into packets and sent over a logical connection.

For example, packets transferred as a response to the query select col1, col2, col3 from table1 order by col1 can be processed in order. To achieve this ordering, the described sequencing scheme could be used to identify the proper sequence of the packets that contain the results of the query.

One embodiment in which out of order processing may be particularly beneficial is when the receiving computer includes multiple processors for processing the received packets. The packets can be split among the multiple processors for processing without the overhead of ensuring that they are processed in order.

In some embodiments, a connection ID may be used to identify which physical connections are included in a logical connection. For example, each network connection established by a physical network device included in a logical connection can be assigned the same connection ID.

Figure 2:
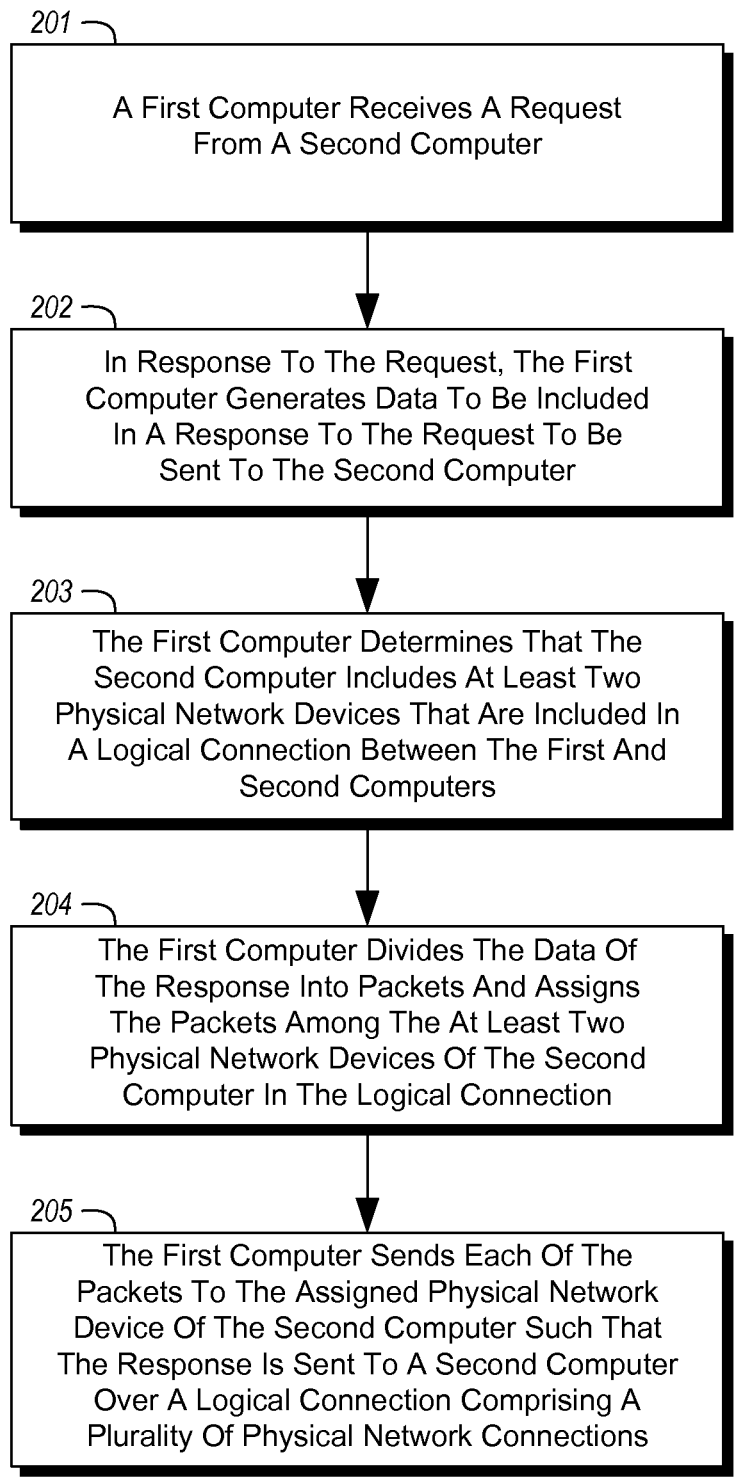
FIG. 2 illustrates an example flowchart of a method for utilizing multiple physical network devices within a logical connection between a first and a second computer.

FIG. 2 illustrates a flowchart of a method 200 for concurrently utilizing multiple network devices within a logical connection to transfer data between a first and a second computer. Method 200 will be described with reference to an example embodiment shown in FIG. 4. In method 200, the first computer transmits data of a response over a logical connection to multiple physical network devices on the second computer. A first computer receives a request from a second computer (act 201). For example, computer 401 receives request 403 from computer 402. The first computer may be a database server, and the request may be a database query. In response to the request, the first computer generates data to be included in a response to the request to be sent to the second computer (act 202). For example, computer 401 can generate response data 404. The data may be data from a database that is retrieved by the execution of the database query.

The first computer determines that the second computer includes at least two physical network devices that are included in a logical connection between the first and second computers. (act 203). For example, computer 401 determines that computer 402 includes NICs 420a-420n, and that the logical connection 430 between the computer 401 and 402 includes at least two of the NICs 420a-420n. The first computer divides the data of the response into packets and assigns the packets among the at least two physical network devices of the second computer in the logical connection (act 204). For example, computer 401 divides response data 404 into packets 404a, 404b, 404c, . . . 404n. The first computer sends each of the packets to the assigned physical network device of the second computer such that the response is sent to the second computer over a logical connection comprising a plurality of physical network connections (act 205). For example, packet 404a is sent to NIC 420a, packets 404c and 404n are sent to NIC 420b, and packet 404d is sent to NIC 420n over logical connection 430.

Figure 4:
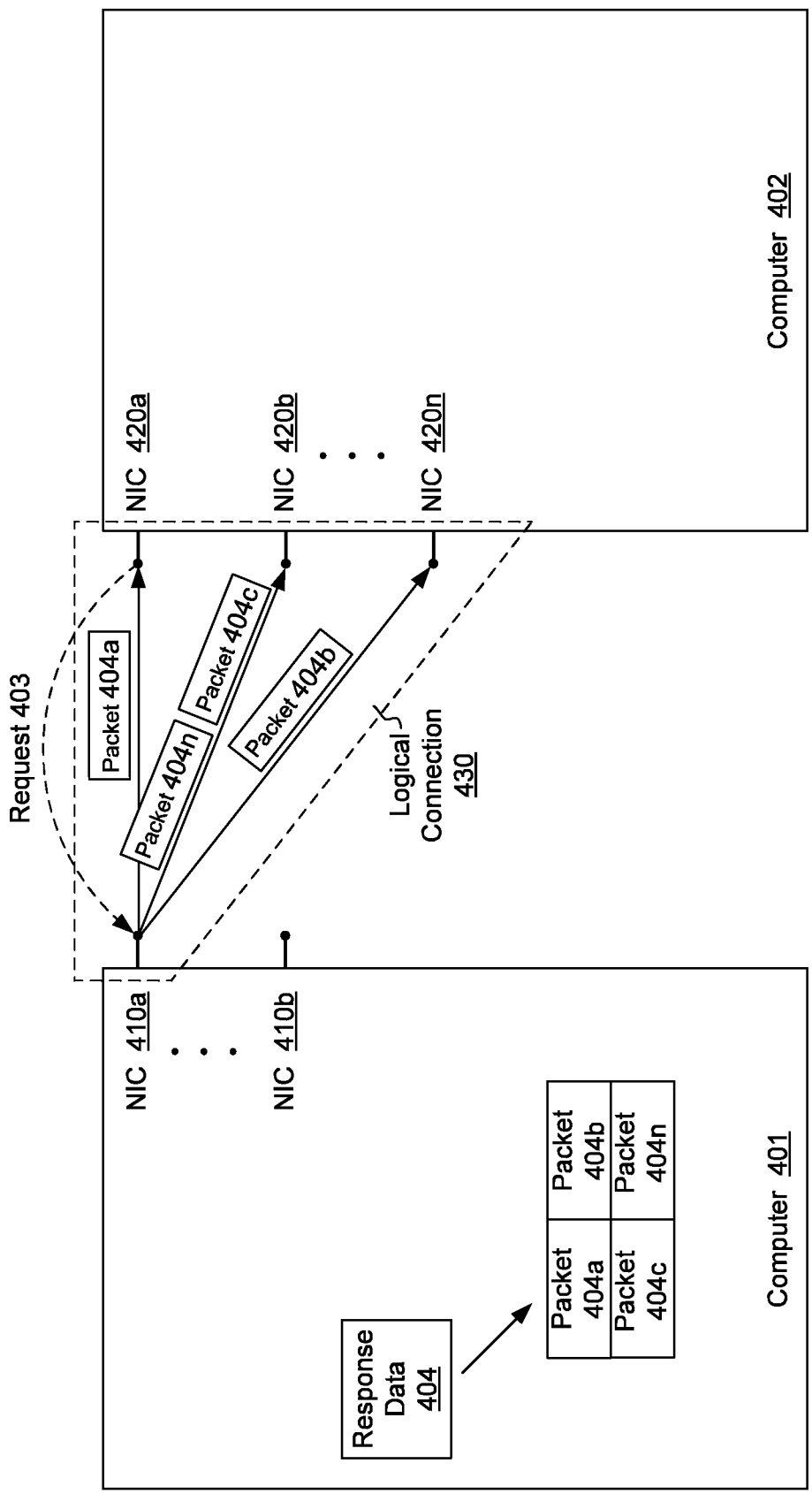
FIG. 4 illustrates an example network architecture in which the method of FIG. 2 may be implemented.

In method 200, the logical connection may include a single physical network device or multiple physical network devices on the first computer. For example, as shown in FIG. 4, NIC 410a can be used to send each of the packets 404a-404n. In the case where the logical connection includes a single physical network device on the first computer, each packet would be sent from the first computer over the same physical network device. In this embodiment, the logical connection can be viewed as a one-to-many logical connection.

In the case where the logical connection includes multiple physical network devices on the first computer, method 200 could further include dividing the packets among the multiple physical network devices on the first computer so that the packets are sent from the first computer over multiple physical network devices. For example, in FIG. 4, the packets 404a-404n can be divided and sent over other NICs, in addition to NIC 410a, on computer 401. In this embodiment, the logical connection can be viewed as a many-to-many logical connection. Any combination of physical network devices on a computer can be used in a logical connection.

Method 200 may further include the first computer assigning an identifier to at least some of the packets. In conjunction with assigning identifiers, the first computer may set a flag in the packets that have been assigned identifiers to indicate to the second computer that the packets should be processed in the proper sequential order. In some embodiments, all the packets are assigned a flag and an identifier to indicate that the entire data transfer requires in order processing. In other embodiments, one or more subsets are assigned a flag and identifiers to indicate that only the subsets require in order processing while the packets that are not within the subsets can be processed when received regardless of ordering. In such embodiments, a different flag can be assigned to each subset to indicate to which subset a packet belongs.

Method 200 may also include modifying the logical connection at any time to add and/or remove a physical network device. A physical network device may be added to or removed from the logical connection at either the first or second computer, or both the first and second computers.

Figure 3:
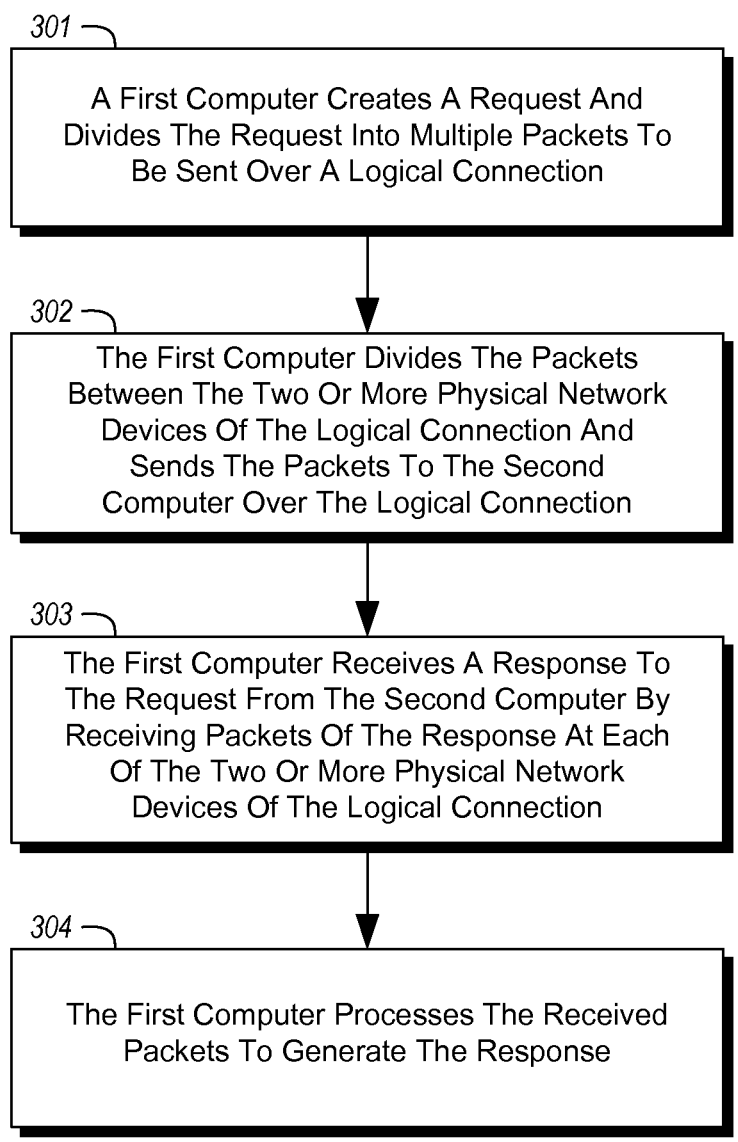
FIG. 3 illustrates an example flowchart of a method for utilizing multiple physical network devices within a logical connection to receive data on a computer.
Figure 5:
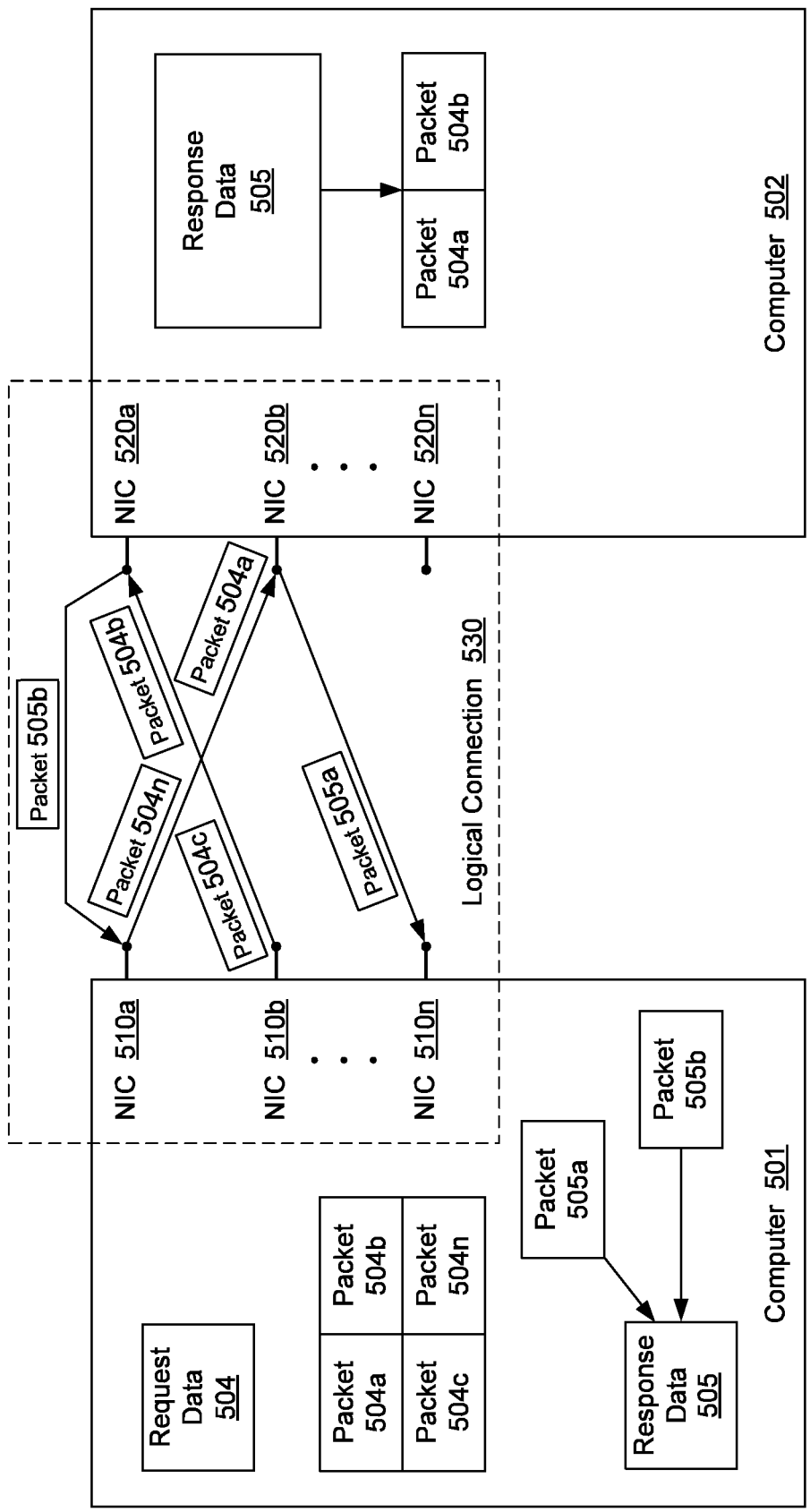
FIG. 5 illustrates an example network architecture in which the method of FIG. 3 may be implemented.

FIG. 3 illustrates a flowchart of a method 300 for utilizing a logical connection between a first and a second computer. Method 300 will be described with reference to an example embodiment shown in FIG. 5. In method 300, the first computer sends data of a request to the second computer over multiple physical network devices of a logical connection. The first computer creates a request and divides the request into multiple packets to be sent over a logical connection. (act 301). The first computer includes multiple physical network devices that can establish network connections to transmit data, and the logical connection includes two or more of the physical network devices on the first computer. For example, computer 501 creates request data 504 and divides it into packets 504a-504n. Computer 501 includes NICs 510a-510n where NIC 510a and 510b are included in the logical connection for sending the packets 504a-504n of request data 504. The second computer may be a database server, and the request may be a batch of database queries. If the request is a batch of database queries, each packet of the request may include a single query of the batch of queries. Additionally, some queries may be split between multiple packets.

The first computer divides the packets between the two or more physical network devices of the logical connection and sends the packets to the second computer over the logical connection (act 302). For example, packets 504a and 504d may be sent by NIC 510b to computer 502 while packets 504b and 504c may be sent by NIC 510a to computer 502 over logical connection 530. The first computer receives a response to the request from the second computer by receiving packets of the response at each of the two or more physical network devices of the logical connection (act 303). For example, packet 505a of response data 505 can be received at NIC 510n while packet 505b can be received at NIC 510a over logical connection 530. The response may be data from the database that was retrieved by executing the database query. The first computer processes the received packets to generate the response (act 304). For example, computer 501 processes packets 505a and 505b to generate response data 505.

Method 300 may include setting a flag by the first computer in at least some of the packets of the request to indicate that at least some of the packets are to be processed by the second computer in a proper sequential order. The sequential ordering may be specified using sequence identifiers assigned to each packet that requires processing in order. For example, packets 504a and 504b may include a flag to indicate that packet 504a is to be processed by computer 502 prior to processing packet 504b.

Method 300 may also include detecting that a flag is set in two or more of the packets of the response received by the first computer indicating that the packets are to be processed in order. Processing the packets in order may include reading a sequence identifier associated with each packet that includes a flag to determine the next sequential packet of the response. For example, packet 505a and 505b received by computer 501 may include a flag indicating to computer 501 that regardless of the order in which the packets 505a and 505b are received, packet 505a is to be processed before packet 505b. In some embodiments, the response is a set of database rows where at least one of the rows is split between two or more packets. In this embodiment, the packets that constitute the split row contain a flag to indicate that the packets are to be processed in order. In some embodiments, only the packets that constitute the split row contain the flag so that only those packets are processed in order. In other embodiments, all packets of the response are marked with a flag so that all the packets, including those that contain an entire row, are processed in order. For example, if the entire result set requires in order processing, each packet in the result set can be assigned a sequence identifier and a flag.

In other embodiments, a result set may include two or more different sets of packets that each require in order processing, but also includes packets that do not require in order processing. Such would be the case if the result set included two or more different rows that were each split into multiple packets. In such embodiments, a unique flag is assigned to the packets of the different result sets. For example, packets of a first set that include portions of a first row of the result set can be assigned a first flag while packets of a second set that include portions of a second row of the result set can be assigned a second flag. In these embodiments, the packets without flags can be processed when received regardless of ordering, while packets with the same flag can be processed in order. For example, packets with the first flag will be processed in order, and packets with the second flag will be processed in order. However, the ordering of the processing of the packets with the first flag is independent of the ordering of the processing of the packets with the second flag. In other words, the packets with the first flag do not all have to be processed before the packets with the second flag. Ordering within a set is all that is required.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   at least one computer-readable medium having stored thereon computer-executable instructions that are executable by the one or more processors to implement a method for utilizing multiple network connections to facilitate data transfer between a first computer and a second computer that communicate with each other over the multiple network connections, the method comprising:
   receiving, at the first computer, a request to send data to the second computer, the first computer comprising one or more network connections that are each usable for connecting to one or more other computers;
   generating, at the first computer, a response that includes the requested data to be sent to the second computer in response to the request;
   dividing, at the first computer, the requested data into a plurality of data packet groupings that include at least a first group of response data packets and a second group of response data packets;
   identifying a logical connection between the first computer and the second computer, the logical connection including a first network connection and a second network connection, wherein a connection ID is assigned to the logical connection such that all network connections included within the logical connection share the connection ID, and whereby the first network connection and the second network connection share the connection ID;
   at the first computer, sending, to the second computer, the first group of response data packets over the logical connection using the first network connection; and
   at the first computer, sending, to the second computer, the second group of response data packets over the logical connection using the second network connection.

2. The system of claim 1, wherein the requested data is divided into the plurality of data packet groupings based on one or more predefined attributes, the one or more predefined attributes including a functionality attribute of the requested data.

3. The system of claim 1, wherein the requested data is divided into the plurality of data packet groupings based on one or more predefined attributes, the one or more predefined attributes including a desired ordering for transmitting or processing the requested data.

4. The system of claim 1, wherein the requested data is divided into the plurality of data packet groupings based on one or more predefined attributes, the one or more predefined attributes including a speed attribute.

5. The system of claim 4, wherein the speed attribute is a speed of data transmission over the first network connection and a speed of data transmission over the second network connection, the speed of data transmission over the first network connection being a higher speed than the speed of data transmission over the second network connection.

6. The system of claim 1, wherein the first computer is a database server, and wherein the request comprises a database query.

7. The system of claim 6, wherein the requested data is divided into the plurality of data packet groupings based on one or more predefined attributes, the one or more predefined attributes including a positioning of requested data that is assigned to the first group of response data packets relative to a positioning of requested data that is assigned to the second group of response data packets within the database server.

8. The system of claim 1, wherein the requested data is divided into the plurality of data packet groupings based on one or more predefined attributes of one or more physical network devices at the second computer, the one or more physical network devices comprising network interface cards.

9. The system of claim 1, wherein the first computer is a client computer and the second computer is a database server.

10. The system of claim 1, wherein the method further includes:
identifying a second logical connection between the first computer and the second computer, the second logical connection at least including a third network connection, the second logical connection also including a distinct connection ID;
receiving a second request for different data; and
at the first computer, sending the different data to the second computer using the second logical connection, wherein sending the first and second group of response data packets over the logical connection occurs concurrently with sending the different data to the second computer, whereby the first computer and the second computer utilize two logical connections concurrently.

11. A computer-implemented method for utilizing multiple network connections to improve data transfer between a first computer and a second computer that communicate with each other over the multiple network connections, the method comprising:
receiving, at the first computer, a request from the second computer for data, the first computer comprising one or more network connections that are each usable for connecting to one or more other computers;
generating, at the first computer, a response that includes the requested data to be sent to the second computer in response to the request;
dividing, at the first computer, the requested data into a plurality of data packet groupings that include at least a first group of response data packets and a second group of response data packets;
identifying a logical connection between the first computer and the second computer, the logical connection including a first network connection and a second network connection, wherein a connection ID is assigned to the logical connection such that all network connections included within the logical connection share the connection ID, and whereby the first network connection and the second network connection share the connection ID;
at the first computer, assigning to the first network connection the first group of response data packets based at least in part on one or more predefined attributes of the first network connection and sending the first group of response data packets to the second computer over the logical connection using the assigned first network connection; and
at the first computer, assigning to the second network connection the second group of response data packets based at least in part on one or more predefined attributes of the second network connection and sending the second group of response data packets to the second computer over the logical connection using the assigned second network connection.

12. The method of claim 11, wherein the requested data is divided into the plurality of data packet groupings based on the one or more predefined attributes of the first and second network connections, the one or more predefined attributes also including a functionality attribute of the requested data.

13. The method of claim 12, wherein the functionality attribute of the requested data is based on the requested data which also includes control information.

14. The method of claim 11, wherein the requested data is divided into the plurality of data packet groupings based on the one or more predefined attributes of the first and second network connections and wherein the one or more predefined attributes includes a speed of data transmission attribute.

15. The method of claim 11, wherein the requested data is divided into the plurality of data packet groupings based on the one or more predefined attributes of the first and second network connections and wherein the one or more predefined attributes also includes a positioning of requested data that is assigned to the first group of response data packets relative to a positioning of requested data that is assigned to the second group of response data packets within a database server.

16. The method of claim 11, wherein the requested data is divided into the plurality of data packet groupings based on the one or more predefined attributes of the first and second network connections that is based at least in part on attributes of first and second physical network devices at the second computer, respectively, the first and second physical network devices comprising network interface cards.

17. A computer storage device having stored thereon computer-executable instructions that are executable by one or more processors of a computer system to implement a method for utilizing multiple network connections to facilitate data transfer between a first computer and a second computer that communicate with each other over the multiple network connections, wherein the method comprises:
receiving, at the first computer, a request from the second computer for data, the first computer comprising capabilities for providing communications over one or more network connections to one or more other computers;

generating, at the first computer, a response that includes the requested data to be sent to the second computer in response to the request;

dividing, at the first computer, the requested data into a plurality of data packet groupings that include at least a first group of response data packets and a second group of response data packets;

identifying a logical connection between the first computer and the second computer, the logical connection including a first network connection and a second network connection, wherein a connection ID is assigned to the logical connection such that all network connections included within the logical connection share the connection ID, and whereby the first network connection and the second network connection share the connection ID;

at the first computer, sending the first group of response data packets to the second computer over the logical connection using the first network connection; and at the first computer, sending the second group of response data packets to the second computer over the logical connection using the second network connection.

18. The computer storage device of claim 17, wherein the requested data is divided into the plurality of data packet groupings based on one or more predefined attributes, the one or more predefined attributes including a functionality attribute of the requested data.

19. The computer storage device of claim 17, wherein the requested data is divided into the plurality of data packet groupings based on one or more predefined attributes, the one or more predefined attributes including a desired ordering for transmitting or processing the requested data.

20. The computer storage device of claim 17, wherein the requested data is divided into the plurality of data packet groupings based on one or more predefined attributes, the one or more predefined attributes including a speed of data transmission attribute corresponding to data transmission speeds to a first physical network device associated with the first network connection and a second physical network device associated with the second network connection.

* * * * *